United States Patent [19]
Walker

[11] Patent Number: 5,843,198
[45] Date of Patent: Dec. 1, 1998

[54] AIR FILTER

[76] Inventor: R. Karl Walker, 1304 Irwin Rd., Powell, Tenn. 37849

[21] Appl. No.: 602,322

[22] Filed: Feb. 16, 1996

Related U.S. Application Data

[63] Continuation-in-part of Ser. No. 261,781, Jun. 20, 1994, abandoned.

[51] Int. Cl.[6] .................................................. B01D 46/10
[52] U.S. Cl. ................................ 55/486; 55/495; 55/502; 55/524; 55/DIG. 31
[58] Field of Search ............................. 55/486, 487, 495, 55/502, 511, DIG. 31, 483, 490, 524, DIG. 24; 95/273, 285, 286, 287

[56] References Cited

U.S. PATENT DOCUMENTS

| | | | |
|---|---|---|---|
| 2,252,724 | 8/1941 | Myers | 183/44 |
| 3,467,257 | 9/1969 | Getzin | 55/495 |
| 3,763,633 | 10/1973 | Soltis | 55/486 |
| 4,518,402 | 5/1985 | Dargel | 55/DIG. 31 |
| 4,634,527 | 1/1987 | Marshall | 210/232 |
| 4,902,306 | 2/1990 | Burnett et al. | 55/486 |
| 4,904,288 | 2/1990 | D'Augereau | 55/487 |
| 5,188,646 | 2/1993 | Nolen, Jr. | 55/DIG. 31 |
| 5,224,974 | 7/1993 | Johnson | 55/486 |
| 5,230,799 | 7/1993 | Willard et al. | 55/495 |
| 5,342,423 | 8/1994 | Taft | 55/483 |
| 5,415,677 | 5/1995 | Ager et al. | 55/502 |
| 5,437,701 | 8/1995 | Townsley | 55/486 |
| 5,525,136 | 6/1996 | Rosen | 55/486 |
| 5,554,205 | 9/1996 | Ernst et al. | 55/511 |

FOREIGN PATENT DOCUMENTS

| | | | |
|---|---|---|---|
| 450299 | 10/1991 | European Pat. Off. | 55/502 |
| 2359729 | 6/1975 | Germany | 55/521 |
| 2620148 | 12/1976 | Germany | 55/502 |

*Primary Examiner*—Duane S. Smith
*Attorney, Agent, or Firm*—Pitts & Brittian, P.C.

[57] ABSTRACT

An air filter for providing a reusable frame and disposable filter media. The air filter includes a frame defining a channel into which a filter medium is removably received and replaceable with another filter medium. This frame also provides a nonconductive static electricity isolator for static charge retainment. A sealing member is secured to the outer surface of the frame to provide a seal between the frame and the HVAC filter mounting assembly into which the frame is inserted. The sealing member is configured to insure an air tight seal such that the air is forced through the filter medium before the air is circulated into a room.

11 Claims, 2 Drawing Sheets

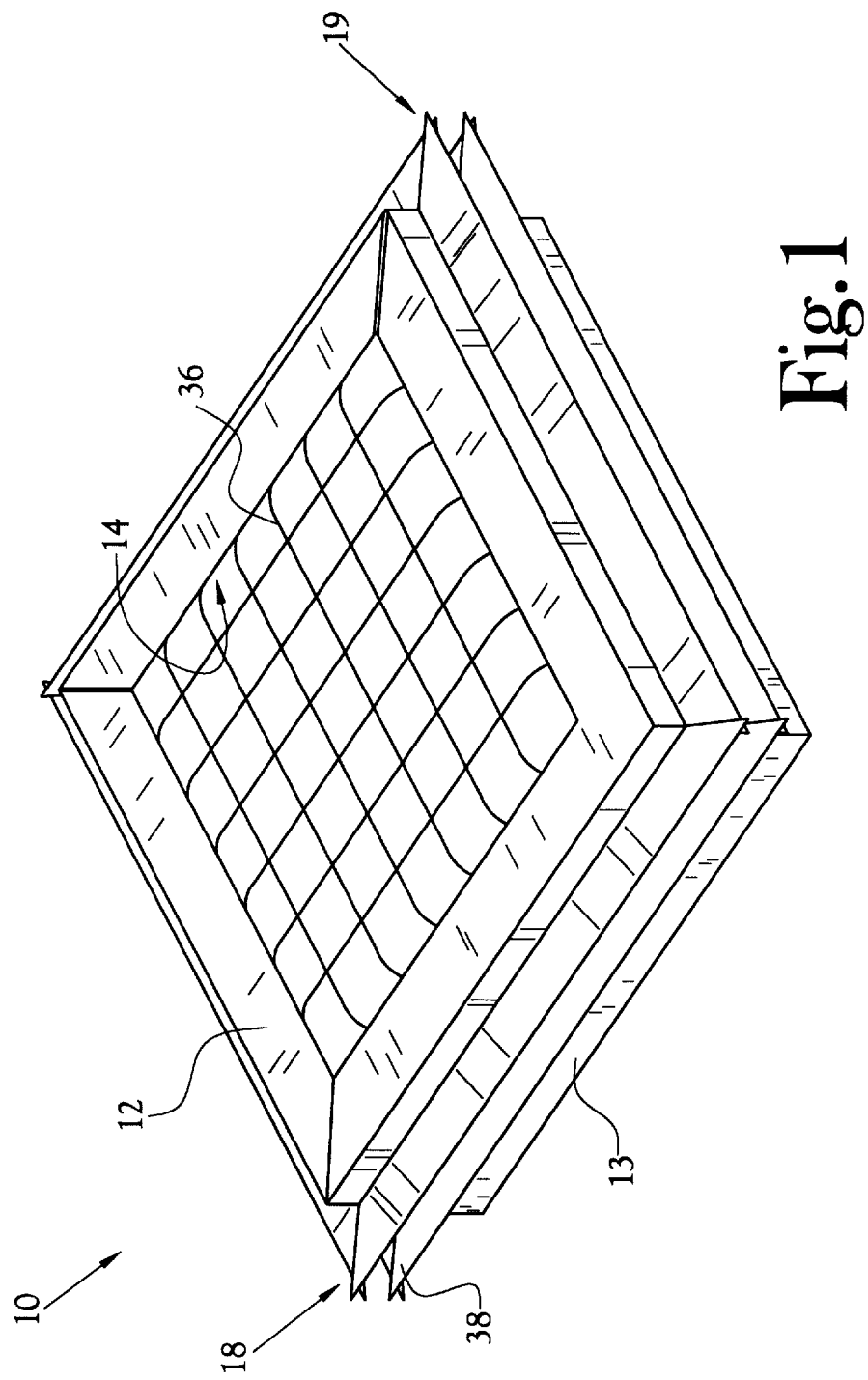

AIR FILTER

This application is a continuation in part, discloses and claims subject matter disclosed in my earlier filed application, Ser. No. 08/261,781 filed on Jun. 20, 1994, now abandoned.

TECHNICAL FIELD

This invention relates to the field of dust or air filters and frames and more specifically to a reusable frame with a removable disposable filter medium.

BACKGROUND OF THE INVENTION

Air or dust filters are used in HVAC systems to filter air and remove particles from the air before the air is circulated into a room. Typically a frame with a filter media is placed in the path of the flow of air to remove such particles. The major disadvantage to air filters presently available in the field is their tendency to leak, permitting particles of dust, mold spores, pollen etc. to pass by the filter and subsequently enter the room.

Other devices have been produced to prevent the leakage of unfiltered air or fluid. Typical of the art are those devices disclosed in U.S. Pat. No. 2,252,724 issued to F. L. Myers on Aug. 19, 1941; U.S. Pat. No. 4,634,527 issued to D. A. Marshall on Jan. 6, 1987 and U.S. Pat. No. 5,342,423 issued to A. A. Taft on Aug. 30, 1994.

U.S. Pat. No. 2,252,724 discloses a disposable air filter which provides a combined filter unit and gasket. The gasket extends outward and acts as seal. The gasket is configured such that the possibility of air leaks is present. The construction of the gasket does not compensate for screws, bolts, nails, etc. that are used in mounting the filter retaining hardware and may interfere with a continuous seal against the side walls of a cell. Further, the filter media and frame are unitary such that the frame can not be used again and must be disposed of when the filter media becomes clogged. Further, the filter media can not be removed from the frame without destroying the frame.

U.S. Pat. No. 4,634,527 discloses a fluid filter element with annular sealing means wherein a sealing element is taught. The fluid filter element is unitary and not intended to be reusable. Once the filter element is no longer useful the device must be discarded. Further, the construction of the device is complex.

U.S. Pat. No. 5,342,423 teaches an air filter for an HVAC system and a method for manufacturing the air filter. The air filter includes a frame and a filter medium. The frame is constructed such that the filter medium is secured within the frame. The filter medium is not replaceable.

Therefore, it is an object of this invention to provide an air filter which provides a reusable frame.

It is yet another object of the present invention to provide an air filter which can removably receive a filter medium such that when the filter medium is exhausted it can be removed and replaced with a new filter medium without the use of tools or the disassembly of the filter frame. Additionally, most replacement methods are performed without the removal of the frame and requires only the use of fingers.

Further, it is an object of the present invention to provide an air filter which provides a leak proof seal between the frame and a HVAC filter mounting structure.

It is another object of the present invention to provide such an air filter in which the seal structure is permanently bonded to the frame.

It is still another object of the present invention to provide an air filter which is easily constructed.

DISCLOSURE OF THE INVENTION

Other objects and advantages will be accomplished by the present invention which provides an air filter with a reusable, remountable frame and disposable filter media. The air filter of the present invention includes a frame and a filter medium. The frame defines a channel in which the filter medium is removably receivable. Further, a sealing member is secured to the outer surface of the frame for providing an air tight seal between the frame and an HVAC filter mounting assembly such that the air is forced through the filter medium.

BRIEF DESCRIPTION OF THE DRAWINGS

The above mentioned features of the invention will become more clearly understood from the following detailed description of the invention read together with the drawings in which:

FIG. 1 is a perspective view of the air filter constructed in accordance with several features of the present invention;

BEST MODE FOR CARRYING OUT THE INVENTION

Figure 3:
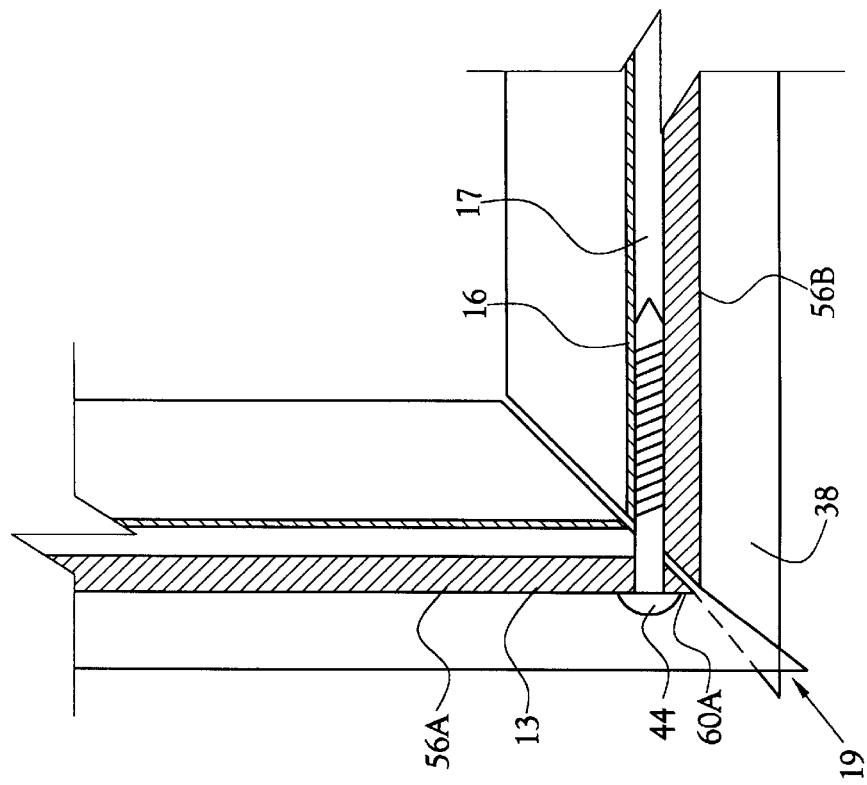
FIG. 3 is a partial cross-sectional view of a corner of the frame.

An air filter incorporating various features of the present invention is illustrated generally at 10 in the figures. The air filter 10 is designed to provide a leak proof seal such that unfiltered air can not enter a room. Moreover, in the preferred embodiment, the air filter 10 is designed to provide a frame which is configured to be reusable wherein the filter medium can be disposed of when laden with dust and other particles and a new filter medium can be inserted into the frame. Subsequently, the frame can be reinserted into the filter mounting structure and an airtight seal can be reestablished or the medium can be removed and replaced with a clean one without the removal of the frame and without the interruption of the frame seal.

The air filter 10 generally includes a frame 12 and a compressible filter medium 30 which is removably secured within the frame 12, as shown in FIG. 1. The filter medium 30 is fabricated such that it removes airborne particles from air passing through the filter medium 30. The frame 12 includes a channel 14 into which the filter medium 30 can be secured. A sealing member 18 is secured to the outer surface 13 of the frame 12 for sealing against the HVAC filter mounting assembly 50 forming a static seal such that the air circulated through an HVAC system is forced through the filter medium 30.

In the preferred embodiment, the filter medium 30 includes a first layer 32 and a second layer 34. The first layer 32 is a loose structure for trapping larger particles. The second layer 34 is denser than the first layer 32 for trapping smaller particles. Preferably, the material of the second layer 34 is coated with an elastomeric latex emulsion tackifier which is non drying. The tackifier provides a tacky, sticky film on the material such that the particles stick to the second layer 34. Further, the tackifier is non-drying such that it remains tacky or sticky for the lifetime of the filter medium 30. In this manner, smaller particles are not apt to bypass the second layer 34 and remain in the airstream. In the preferred embodiment, the layers 32, 34 of the filter medium 30 are fabricated from a synthetic, non-woven material. Further, the two layers 32, 34 are interconnected at the mating faces such that the filter medium 30 is unitary. In the preferred embodiment, the first and second layers 32, 34 are different colors to readily indicate the two different layers.

Figure 2:
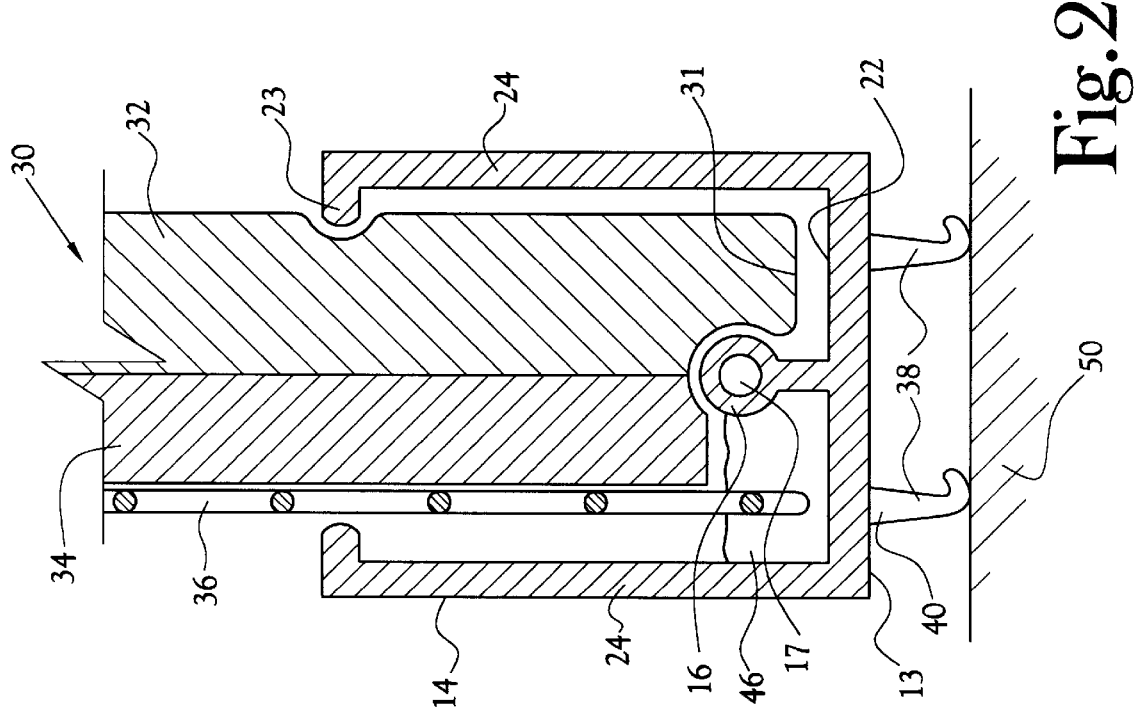
FIG. 2 is a cross-sectional view of the air filter of FIG. 1.

The frame 12 generally includes a channel 14, which is defined by an interior wall 22 and two side walls 24 extending therefrom, and a ridge member 16, which runs the length of the channel proximate the interior wall 22, as shown in FIG. 2. The channel 14 is configured to receive the filter medium 30. The ridge member 16 serves to engage the perimeter 31 of the filter medium to assist in securing the filter medium 30 in place. Further, in the preferred embodiment, the channel 14 defines a lip 23 at an upper portion of each side wall 24 to more securely hold the filter medium 30 within the channel 14. The frame 12 is dimensioned to closely fit within the filter mounting structure 50. In the preferred embodiment, the frame is fabricated from a rigid, lightweight material such as polyvinyl chloride (PVC).

In the preferred embodiment, a filter grid 36 is supported within the channel 14 of the frame 12 as well. The filter grid 36 supports the filter medium 30 such that the filter medium 30 is not forced out of the frame due the air flow through the filter medium 30. The filter grid 36 is securely held within the channel 14 between one of the side walls 24 of the channel 14 and the ridge member 16, as shown in FIG. 2. In the preferred embodiment, the filter grid 36 is retained in the channel 14 with glue 46, as shown in FIG. 2. Specifically, a portion of one of the side walls 24, a portion of the interior wall and one side of the ridge member 16 serve as a glue pot for receiving glue 46 therein to retain the edge of the filter grid 36 in position. With the filter grid 36 secured in this manner, the filter medium 30 does not snag on the edges of filter grid 36 when removing the filter medium 30. Preferably, the filter grid 36 is fabricated from a metal wire screen with ½" openings. It will be noted that the filter grid 36 can be fabricated from any suitable material which can sufficiently support the filter medium 30. Further, the wire screen openings are not limited to ½" openings and may be smaller or larger provided the filter medium 30 is sufficiently supported and air flow through the air filter 10 is not impeded.

The sealing member 18 is secured to the outer surface 13 of the frame 12 and is constructed to establish a tight seal against the walls of an HVAC filter mounting structure 50. The sealing member 18 is fabricated from a flexible, resilient material. The sealing member 18 must be sufficiently flexible to permit the frame to be slid into the filter mounting assembly, yet, stiff enough to establish and maintain a seal and, further, resilient enough such that upon removal and subsequent reinsertion, a tight seal can be reestablished. In the preferred embodiment, the sealing member is fabricated from TPE (thermal plastic elasticity).

In the preferred embodiment, the sealing member 18 is comprised of two parallel seal strips which are spaced apart to form a dual seal 38, as shown most clearly in FIGS. 1 and 2. In the preferred embodiment, each of the seal strips 38 is wedge shaped, as shown in FIG. 2, wherein the wider portion 40 of each seal 38 is secured to the frame 12. This embodiment provides the dual seal 38 with the flexibility needed to insert the frame 12 into the filter mounting structure 50 and the stiffness necessary to establish and maintain a seal. The dual seal 38 serves to ensure an air tight seal. For example, where the wall of the HVAC filter mounting structure 50 includes an irregularity or a nail, screw etc. which prevents one of the seals 38 from establishing a seal, the other seal 38 can contact the wall of the HVAC filter mounting structure 50 and establish a seal. The use of TPE material for the seals 38 is advantageous because of the resilient property of TPE. TPE is a resilient material which does not have memory such that upon removal from filter mounting structure 50, the TPE sealing strips 38 return their original configuration. Seals fabricated from traditional vinyl form a memory or set up to any irregular surfaces encountered in the filter mounting structure. Upon removal of the frame from the mounting structure, a vinyl strip retains memory of the irregular surface. Upon reinsertion, the vinyl strip would not seal properly against the mounting.

Filter mounting structures for holding standard size air filters vary as much as ⅝ of an inch in both length and width from one manufacturer to another. Accordingly, to achieve a universal fit of the air filter in all filter mounting structures, each of the seals extends from the filter frame approximately 0.375 of an inch.

Moreover, the TPE material serves as a static electricity insulator or a static charge isolator. Electrostatic filters used in metal filter grills without static insulators allow for a critical path of static discharge and diminish the electrostatic effect during air flow. When the HVAC system cycles and shuts off the air flow, the static electric charge dissipates from the filters At restart, the electrostatic filter releases collected particles into the air stream and continues to do so until the static charge is revived from the restarted air flow. The TPE seals act as both dust bypass seal and a non-conductive static electricity isolator for static charge retainment. The filter media is fabricated from a nonwoven, synthetic material which, when placed in the air flow of an HVAC system, receives an electrostatic charge.

In the preferred embodiment, the frame 12 is constructed by securing a plurality of sections 56, usually four, together. Each of the sections is configured such that one section can be mated and secured to another. In the preferred embodiment, the frame 12 and dual seal strips 38 are simultaneously extruded to form a structure with a cross section as shown in FIG. 2. The dual seal 38 is simultaneously extruded with the frame 12 to permanently bond the dual seal 38 to the frame 12. The structure is cut into sections 56 of selected lengths. The ends 60 of each section 56 are mitered and sections 56 of particular lengths are mated, depending upon the size of the frame 12 desired. Preferably, the seals 38 are mitered in a manner such that when two lengths are mated to form a corner 19, the seals 38 overlap each other at the corner 19, as shown in FIG. 3. In the preferred embodiment, a sheet metal screw 44 is used to secure two sections 56 together. This is accomplished by aligning the mitered ends 60 of two sections 56 and screwing in a sheet metal screw 44 through the outer surface 13 of the first section 56A proximate the end 60A such that the screw 44 is secured within the ridge member 16 of the second section 56B, as shown in FIG. 3. In the preferred embodiment, the ridge member 16 defines an opening 17 for receiving a screw 44, as shown in FIG. 2. It will be noted that in an alternate embodiment, the ridge member can be solid. The filter grid 36 is inserted into and glued within a portion of the channel the frame 12 before it is fully constructed.

To use the air filter 10, a filter medium 30 is secured within the channel 14 of the frame 12 forcibly pushing the perimeter 31 of the filter medium 30 into the channel 14. It is preferable that the second layer 34 of the filter medium 30 faces the filter grid 36 and the first layer 32 faces outward. The frame 12, which is dimensioned to fit within the selected HVAC filter mounting structure 50 is forcibly slid into the mounting structure 50 thereby establishing a seal with the mounting structure 50. The double set of overlapping seals at the corners 19 provides a complete seal at each corner of the filter mounting structure. The frame 12 is mounted into the filter mounting structure 50 such that the filter grid 36 faces toward the HVAC system or the first layer 32 faces out. In this manner, the air flow is forced through the through the first layer 32 of the filter medium 36 and then the second layer 34. With this configuration, the second denser and sticky layer 34 of the filter medium 30 does not become clogged too quickly. The filter grid 36 prevents the filter medium 30 being forced out of the frame 12 when air flows through the filter medium 30. When the filter medium 30 becomes clogged, the frame 12 is removed from the HVAC mounting structure 50 and the filter medium 30 is removed from the channel 14 of the frame 12 and discarded. A new filter 30 is secured in the frame 12 in the same manner as stated above and the frame 12 is reinserted in the filter mounting structure 50.

From the foregoing description, it will be recognized by those skilled in the art that an air filter offering advantages over the prior art has been provided. Specifically, the air filter provides a reusable frame with a disposable filter medium. The frame provides a sealing structure for establishing a leak proof seal against an HVAC filter mounting structure such that the air flow is forced through the filter medium. Further, the sealing member is configured such that the seal can be repeatedly released and reestablished. The frame is configured to receive a filter medium which is removable such that a used filter medium can be replaced with a new filter medium. Further, the air filter is easily constructed.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. An air filter for mounting in an HVAC filter mounting structure and for filtering air flowing through the HVAC system, said air filter comprising:

a frame defining a channel having an interior wall and spaced first and second side walls connected thereto;

a compressible filter medium for filtering the air flowing through the HVAC system, said filter medium being received in said channel in engagement on a first side to said channel first side wall such as to be retained about a perimeter of said filter medium in a direction toward said channel first side wall, said compressible filter medium being removable from and reinsertable in said channel, said side walls defining a space therebetween for permitting the removal and reinsertion of said compressible filter medium;

a filter grid for supporting said filter medium, said filter grid being retained independently of said filter medium within said channel proximate said channel second side wall, said filter medium being in engagement on a second side thereof to said filter grid such as to be retained over said filter medium second side in a direction toward said channel second side wall, thereby substantially preventing movement of said filter medium as a result of air flowing therethrough, said filter grid permitting passage of particulate retainable by filter medium; and, a sealing member secured to an outer surface of said interior wall of said frame, said sealing member for providing a repeatedly releasable seal between said outer surface of said frame and the HVAC filter mounting structure, said sealing member being configured such that said frame is wedgeable in the mounting structure.

2. The air filter of claim 1 wherein said sealing member includes at least two sealing strips for providing a continuous seal between said frame and the HVAC filter mounting structure, each of said at least two sealing strips extending outward from said outer surface of said frame, said frame defining four corners, each of said at least two sealing strips defining four sections, each of said four sections overlapping one another at each of said four corners.

3. The air filter of claim 2 wherein said frame defines four corners, each of said at least two sealing strips defining four sections, each of said four sections overlapping one another at each of said four corners.

4. The air filter of claim 2 wherein each of said at least two sealing strips is fabricated from thermal plastic elasticity (TPE) and serving as a nonconductive static electricity isolator for static charge retainment, said filter medium being fabricated from a nonwoven synthetic material which receives an electrostatic charge when placed in the air flow of the HVAC system.

5. The air filter of claim 1 wherein said frame further includes a ridge member secured to said interior wall of said frame within said frame, said ridge member retaining said filter grid within said channel between one of said side walls of said channel and said ridge member.

6. The air filter of claim 5 wherein glue is receivable in said channel between said ridge member and one of said side walls for securely holding the edges of said filter grid.

7. An air filter for mounting in an HVAC filter mounting structure and for filtering air flowing through the HVAC system, said air filter comprising:

a frame defining a channel having an interior wall and spaced first and second side walls connected thereto;

a compressible filter medium for filtering the air flowing through the HVAC system, said filter medium being received in said channel in engagement on a first side to said channel first side wall such as to be retained about a perimeter of said filter medium in a direction toward said channel first side wall, said filter medium being removable from and reinsertable in said channel, said side walls defining a space therebetween for permitting the removal and reinsertion of said compressible filter medium;

a filter grid for supporting said filter medium, said filter grid being retained independently of said filter medium within said channel proximate said channel second side wall, said filter medium being in engagement on a second side thereof to said filter grid such as to be retained over said filter medium second side in a direction toward said channel second side wall, thereby substantially preventing movement of said filter medium as a result of air flowing therethrough, said filter grid permitting passage of particulate retainable by filter medium; and, a sealing member secured to an outer surface of said interior wall of said frame, said sealing member defining at least two sealing strips for providing a repeatedly releasable, continuous seal between said frame and the HVAC filter mounting structure, each of said at least two sealing strips extending outward from said outer surface of said interior wall of said frame, said sealing member being configured such that said frame is wedgeable in the mounting structure, said frame defining four corners, each of said at least two sealing strips defining four sections, each of said four sections overlapping at each of said four corners.

8. The air filter of claim 7 wherein said frame further includes a ridge member secured to said interior wall of said frame within said frame, said ridge member retaining said filter grid within said channel between one of said side walls of said channel and said ridge member.

9. The air filter of claim 8 wherein glue is receivable in said channel between said ridge member and one of said side walls for securely holding the edges of said filter grid.

10. The air filter of claim 7 wherein said frame defines four corners, each of said at least two sealing strips defining four sections, each of said four sections overlapping at each of said four corners.

11. An air filter for mounting in an HVAC filter mounting structure and for filtering air flowing through the HVAC system, said air filter comprising:

a frame defining a channel having an interior wall and spaced first and second side walls connected thereto, said frame defining a ridge member secured to said interior wall of said frame within said frame;

a compressible filter medium for filtering the air flowing through the HVAC system, said filter medium being received in said channel in engagement on a first side to said channel first side wall such as to be retained about a perimeter of said filter medium in a direction toward said channel first side wall, said compressible filter medium being removable from and reinsertable in said channel;

a filter grid for supporting said filter medium, said filter grid being retained independently of said filter medium within said channel proximate said channel second side wall, said filter medium being in engagement on a second side thereof to said filter grid such as to be retained over said filter medium second side in a direction toward said channel second side wall, thereby substantially preventing movement of said filter medium as a result of air flowing therethrough, said ridge member retaining said filter grid within said channel between one of said side walls of said channel and said ridge member, glue being retainable in said channel between said ridge member and one of said side walls for securely holding the edges of said filter grid; and, a sealing member secured to an outer surface of said frame, said sealing member for providing a seal between said outer surface of said frame and the HVAC filter mounting structure.

* * * * *